US009092630B2

(12) United States Patent
Martinez

(10) Patent No.: US 9,092,630 B2
(45) Date of Patent: Jul. 28, 2015

(54) SYSTEMS AND METHODS FOR ISOLATION OF INFORMATION HANDLING RESOURCES IN RESPONSE TO EXTERNAL STORAGE RESOURCE BOOT

(71) Applicant: Dell Products L.P., Round Rock, TX (US)

(72) Inventor: Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 292 days.

(21) Appl. No.: 13/680,357

(22) Filed: Nov. 19, 2012

(65) Prior Publication Data

US 2014/0143530 A1 May 22, 2014

(51) Int. Cl.
*G06F 21/57* (2013.01)
*G06F 9/44* (2006.01)
*G06F 21/56* (2013.01)

(52) U.S. Cl.
CPC ............ *G06F 21/575* (2013.01); *G06F 9/4401* (2013.01); *G06F 21/566* (2013.01); *G06F 2221/2147* (2013.01)

(58) Field of Classification Search
CPC .................................................... G06F 9/4401
USPC ................................................................ 713/2
See application file for complete search history.

(56) References Cited

U.S. PATENT DOCUMENTS

| 5,696,968 | A | 12/1997 | Merkin |
| 6,154,819 | A | 11/2000 | Larsen et al. |
| 6,499,092 | B1* | 12/2002 | Harwood, III et al. ....... 711/163 |
| 8,125,986 | B2* | 2/2012 | Narayanaswami et al. ... 370/360 |
| 8,135,945 | B2* | 3/2012 | Gehrmann ........................ 713/2 |
| 8,185,730 | B1 | 5/2012 | Streuter et al. |
| 2005/0033954 | A1* | 2/2005 | Wang et al. ....................... 713/2 |
| 2011/0131662 | A1* | 6/2011 | Matsuoka ........................ 726/26 |
| 2012/0117369 | A1 | 5/2012 | Gehrmann |
| 2012/0254995 | A1 | 10/2012 | Sallam |

OTHER PUBLICATIONS

International Search Report and Written Opinion, International Patent Application No. PCT/US2013/069175, mailed May 7, 2014; 8 pages.
"BIOS" definition, Microsoft Computer Dictionary, 5th Ed., p. 60 (2002).

* cited by examiner

*Primary Examiner* — Suresh Suryawanshi
(74) *Attorney, Agent, or Firm* — Jackson Walker L.L.P.

(57) ABSTRACT

An information handling system may include a processor, at least one information handling resource, at least one external port configured to receive an external information handling resource and couple the external information handling resource to the processor, and a basic input/output system. The basis input/output system may comprise a program of instructions executable by the processor and configured to cause the processor to determine whether a current boot session of the information handling system was initiated by a boot from an external storage resource coupled to the at least one external port, and in response to a determination that the current boot session of the information handling system was initiated by a boot from an external storage resource coupled to the at least one external port, disable one or more of the at least one information handling resource for the current boot session.

20 Claims, 1 Drawing Sheet

SYSTEMS AND METHODS FOR ISOLATION OF INFORMATION HANDLING RESOURCES IN RESPONSE TO EXTERNAL STORAGE RESOURCE BOOT

TECHNICAL FIELD

The present disclosure relates in general to information handling systems, and more particularly to isolating information handling resources of an information handling system in response to an external storage resource boot.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often configured to receive an external storage resource via an external port located at a periphery of the chassis or other enclosure housing the information handling system. In certain instances, it may be desirable for a user to boot an information handling system from bootable media stored on such an external storage resource. However, the prominence of such devices often make them attractive to attackers, and can be used to perpetuate viruses, malware, spyware, and/or other harmful programs and data to an information handling system or via a network of information handling systems.

SUMMARY

In accordance with the teachings of the present disclosure, the disadvantages and problems associated with information handling system security when booting from an external storage resource have been reduced or eliminated.

In accordance with embodiments of the present disclosure, an information handling system may include a processor, at least one information handling resource, at least one external port configured to receive an external information handling resource and couple the external information handling resource to the processor, and a basic input/output system. The basis input/output system may comprise a program of instructions executable by the processor and configured to cause the processor to determine whether a current boot session of the information handling system was initiated by a boot from an external storage resource coupled to the at least one external port, and in response to a determination that the current boot session of the information handling system was initiated by a boot from an external storage resource coupled to the at least one external port, disable one or more of the at least one information handling resource for the current boot session.

In accordance with these and other embodiments of the present disclosure, a method may include determining whether a current boot session of an information handling system was initiated by a boot from an external storage resource coupled to an external port of the information handling system. The method may further include in response to a determination that the current boot session of the information handling system was initiated by a boot from an external storage resource coupled to the external port, disabling one or more information handling resources of the information handling system for the current boot session.

In accordance with these and other embodiments of the present disclosure, an article of manufacture may include a computer readable medium and computer-executable instructions carried on the computer readable medium. The instructions may be readable by a processor, the instructions, when read and executed, for causing the processor to: (i) determine whether a current boot session of an information handling system was initiated by a boot from an external storage resource coupled to an external port of the information handling system; and (ii) in response to a determination that the current boot session of the information handling system was initiated by a boot from an external storage resource coupled to the external port, disable one or more information handling resources of the information handling system for the current boot session.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
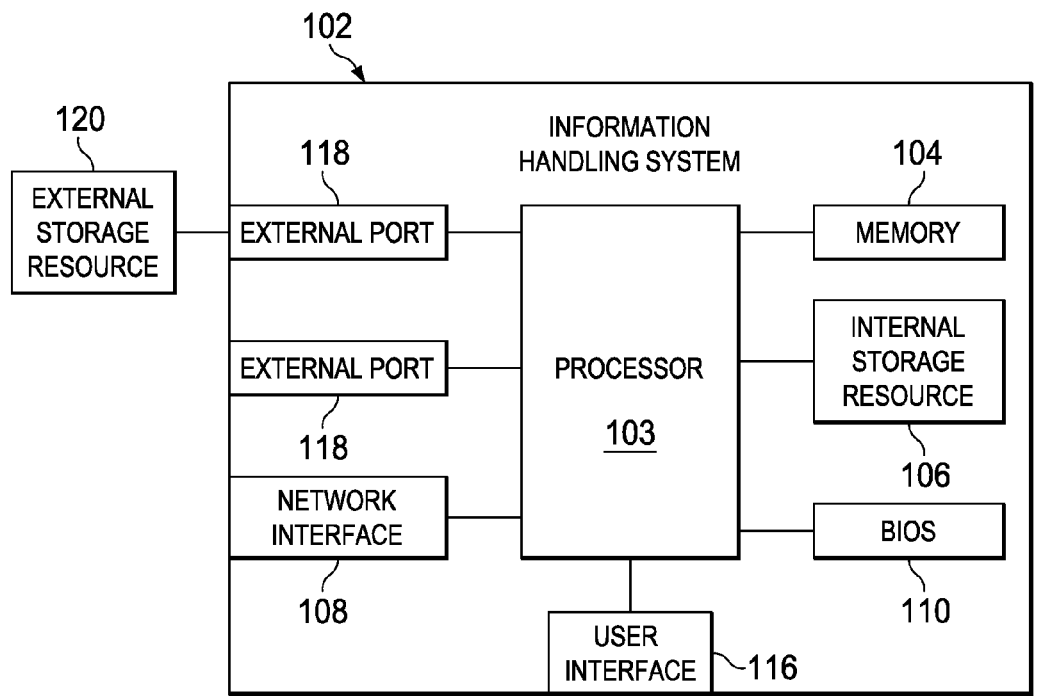
FIG. 1 illustrates a block diagram of an example information handling system adapted to isolate information handling resources in response to an external storage resource boot, in accordance with certain embodiments of the present disclosure.
Figure 2:
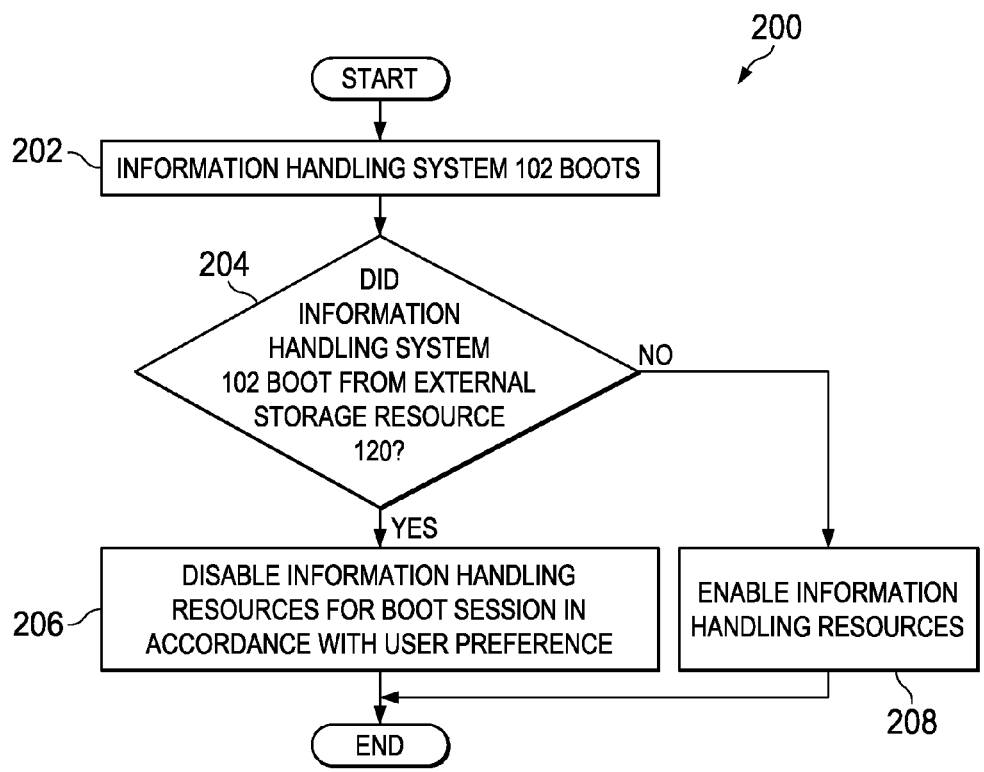
FIG. 2 illustrates a flow chart of an example method for isolating information handling resources in response to an external storage resource boot, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102 adapted to isolate information handling resources in response to an external storage resource boot, in accordance with certain embodiments of the present disclosure. In some embodiments, information handling system 102 may be a server. In others embodiment, information handling system 102 may be a personal computer (e.g., a desktop computer or a portable computer). As depicted in FIG. 1, information handling system 102 may include a processor 103, a memory 104 communicatively coupled to processor 103, an internal storage resource 106 communicatively coupled to processor 103, a network interface 108 communicatively coupled to processor 103, basic input/output system (BIOS) 110 communicatively coupled to processor 103, a user interface 116 coupled to processor 103, and one or more external ports 118 coupled to processor 103 for receiving external devices, including one or more external storage resources 120.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, internal storage resource 106, BIOS 110, an external storage resource 120 coupled via an external port 118, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Internal storage resource 106 may be communicatively coupled to processor 103 and may include any system, device, or apparatus configured to retain program instructions or data for a period of time (e.g., a computer-readable medium). In some embodiments, internal storage resource 106 may include a hard disk drive, a magnetic tape library, an optical disk drive, a magneto-optical disk drive, a compact disc drive, a solid state storage drive, a flash drive and/or any other suitable computer-readable medium. As its name suggests, internal storage resource 106 is intended to reside internal to a chassis or other enclosure comprising information handling system 102 and not be readily accessible without opening such chassis or other enclosure.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface may interface with one or more networks implemented as, or part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102. In addition, the various operational settings and parameters of BIOS 110 may be user-configurable, in that a user of information handling system 102 may, via user interface 116, input an indication that the user desires to configure BIOS settings (e.g., by entering one or more keystrokes at boot or power up of information handling system 102). In configuring BIOS settings, a user may set preferences regarding whether particular information handling resources are enabled or disabled during operation of information handling system. In addition, as set forth in greater detail elsewhere in this disclosure, a user may set preferences regarding whether certain information handling resources are enabled or disabled in response to a determination that information handling system 102 has booted from an external storage resource 120.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

An external port 118 may comprise an interface for receiving a readily removable external information handling resource attached to an exterior of chassis or other enclosure housing information handling system 102 and for electrically coupling (e.g., either directly or via electrically-conductive cable) such external information handling resource to processor 103 and/or other components of information handling system 102. An external port 118 may be compliant with any relevant standard or protocol, including without limitation Universal Serial Bus (USB) and Serial Advanced Technology Attachment (SATA).

As shown in FIG. 1, an external device, for example external storage resource 120, may be received by an external port 118. Similar to internal storage resource 106, external storage resource 120 may include any system, device, or apparatus configured to retain program instructions or data for a period of time (e.g., a computer-readable medium) and may include a hard disk drive, a magnetic tape library, an optical disk drive, a magneto-optical disk drive, a compact disc drive, a solid state storage drive, a flash drive and/or any other suitable computer-readable medium. As its name suggests, external storage resource 120 is intended to reside external to a chassis or other enclosure comprising information handling system 102 such that it is readily accessible without opening such chassis or other enclosure.

In certain instances, a user of information handling system 102 may desire to boot from an external storage resource 120, and to do so, may insert an external storage resource 120 with bootable media into an external port 118 and boot information handling system 102. In some embodiments, information handling system 102 may boot automatically to an external storage resource 120 if such external storage resource 120 comprises bootable media. In other embodiments, a user may provide an indication via user interface 116 (e.g., via a particular keystroke or keystrokes) of a desire to boot from the external storage resource 120. However, as noted in the "Background" section of this disclosure, such practice may be fraught with security risks.

To combat these risks, BIOS 110 may be configured to, during execution of its boot sequence, determine if information handling system 102 is being booted from an external storage resource 120. In response to a determination that information handling system 102 is being booted from an external storage resource 120, BIOS 110 may disable one or more information handling resources of information handling system 102 during the particular boot session. For example, in some embodiments, BIOS 110 may disable internal storage resource 106 for an entire boot session in response to a boot from an external storage resource 120, thus preventing malicious code or data from transferring from the external storage resource 120 to internal storage resource 106. As another example, in these and other embodiments, BIOS 110 may disable network interface 108 for an entire boot session in response to a boot from an external storage resource 120, thus preventing malicious code or data from transferring from the external storage resource 120 to other networked information handling systems (e.g., via wired or wireless transmissions).

In some embodiments, the identity of information handling resources disabled in response to a boot from an external storage resource 120 may be user-configurable. In such embodiments, a user may identify information handling resources disabled in response to a boot from an external storage resource 120 by accessing settings and parameters of the BIOS 110, as described above. Accordingly, based on user preferences, BIOS 110 may maintain a list of information handling resources to be enabled during a boot session initiated by a boot from an external storage resource 120 and a list of information handling resources to be disabled during a boot session initiated by a boot from an external storage resource 120, and may further enable and disable information handling resources based on the contents of such lists.

To disable information handling resources, BIOS 110 may use hardware-specific locking registers, when available, to prevent such information handling resources from being enabled by an operating system executing on information handling system 102. Alternatively, when such registers are not available, BIOS 110 may create an I/O trap for each disabled information handling resource that may generate an interrupt (e.g., System Management Interrupt) when enable registers are accessed so that BIOS 110 can override the attempted enable.

FIG. 2 illustrates a flow chart of an example method 200 for isolating information handling resources in response to an external storage resource boot, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, information handling system 102 may boot. At step 204, BIOS 110 may determine whether information handling system 102 booted from an external storage resource 120. If it is determined that information handling system 102 booted from an external storage resource 120, method 200 may proceed to step 206. Otherwise, if it is determined that information handling system 102 did not boot from an external storage resource 120, method 200 may proceed to step 208.

At step 206, in response to a determination that information handling system 102 booted from an external storage resource 120, BIOS 110 may disable one or more information handling systems for the boot session in accordance with user preferences, as set forth in user-configurable settings and parameters for BIOS 110. After completion of step 206, method 200 may end.

At step 208, in response to a determination that information handling system 102 did not boot from an external storage resource 120, BIOS 110 may allow an operating system executing on information handling system 102 to access information handling resources that would otherwise be disabled if information handling system 102 booted from an external storage resource 120. After completion of step 208, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   at least one information handling resource;
   at least one external port configured to receive an external information handling resource and couple the external information handling resource to the processor; and
   a basic input/output system comprising a program of instructions executable by the processor and configured to cause the processor to:
      determine whether a current boot session of the information handling system was initiated by a boot from an external storage resource coupled to the at least one external port; and
      in response to a determination that the current boot session of the information handling system was initiated by a boot from an external storage resource coupled to the at least one external port, disable one or more of the at least one information handling resources for the current boot session.

2. The information handling system of claim 1, the basic input/output system further configured to cause the processor to, in response to a determination that the current boot session of the information handling system was initiated by a boot from the external storage resource, allow an operating system executing on the processor to access information handling resources that would otherwise be disabled if the current boot session was initiated by a boot from the external storage resource.

3. The information handling system of claim 1, wherein the basic input/output system disables one or more of the at least one information handling resource for the current boot session based on a user preference.

4. The information handling system of claim 3, wherein the user preference is set forth in user-configurable settings and parameters for the basic input/output system.

5. The information handling system of claim 1, wherein disabling the at least one information handling resource for the current boot session comprises configuring hardware-specific locking registers associated with the disabled information handling resources, to prevent the disabled information handling resources from being enabled by an operating system executing on the information handling system.

6. The information handling system of claim 1, wherein disabling the at least one information handling resource for the current boot session comprises instituting an input/output trap for each disabled information handling resource, such that when an enable register for a disabled information handling resource is accessed by an operating system executing on the information handling system, an interrupt is generated allowing the basic input/output system to override the attempted access to the enable register.

7. The information handling system of claim 1, wherein the at least one information handling resource comprises at least one of an internal storage resource and a network interface.

8. A method comprising:
   determining, by a basic input/output system of an information handling system, whether a current boot session of the information handling system was initiated by a boot from an external storage resource coupled to an external port of the information handling system; and
   in response to a determination that the current boot session of the information handling system was initiated by a boot from an external storage resource coupled to the external port, disabling, by the basic input/output system, one or more information handling resources of the information handling system for the current boot session.

9. The method of claim 8, the method further comprising, in response to a determination that the current boot session of the information handling system was initiated by a boot from the external storage resource, allowing an operating system executing on a processor of the information handling system to access information handling resources that would otherwise be disabled if the current boot session was initiated by a boot from the external storage resource.

10. The method of claim 8, wherein disabling one or more information handling resources of the information handling system for the current boot session comprises disabling one or more information handling resources for the current boot session based on a user preference.

11. The method of claim 10, wherein the user preference is set forth in user-configurable settings and parameters for a basic input/output system of the information handling system.

12. The method of claim 8, wherein disabling the one or more information handling resources for the current boot session comprises configuring hardware-specific locking registers associated with the disabled information handling resources, to prevent the disabled information handling resources from being enabled by an operating system executing on the information handling system.

13. The method of claim 8, wherein disabling the one or more information handling resources for the current boot session comprises instituting an input/output trap for each disabled information handling resource, such that when an enable register for a disabled information handling resource is accessed by an operating system executing on the information handling system, an interrupt is generated allowing a basic input/output system of the information handling system to override the attempted access to the enable register.

14. The method of claim 8, wherein the at least one information handling resource comprises at least one of an internal storage resource and a network interface.

15. An article of manufacture comprising:
   a computer readable medium; and
   computer-executable basic input/output system instructions carried on the computer readable medium, the instructions readable by a processor, the instructions, when read and executed, for causing the processor to:
      determine whether a current boot session of an information handling system was initiated by a boot from an external storage resource coupled to an external port of the information handling system; and in response to a determination that the current boot session of the information handling system was initiated by a boot from an external storage resource coupled to the external port, disable one or more information handling resources of the information handling system for the current boot session.

16. The article of claim 15, the instructions for further causing the processor to, in response to a determination that the current boot session of the information handling system was initiated by a boot from the external storage resource, allow an operating system executing on the processor to access information handling resources that would otherwise be disabled if the current boot session was initiated by a boot from the external storage resource.

17. The article of claim 15, wherein disabling one or more information handling resources of the information handling system for the current boot session comprises disabling one or more information handling resources for the current boot session based on a user preference.

18. The article of claim 17, wherein the user preference is set forth in user-configurable settings and parameters for a basic input/output system of the information handling system.

19. The article of claim 15, wherein disabling the one or more information handling resources for the current boot session comprises configuring hardware-specific locking registers associated with the disabled information handling resources, to prevent the disabled information handling resources from being enabled by an operating system executing on the information handling system.

20. The article of claim 15, wherein disabling the one or more information handling resources for the current boot session comprises instituting an input/output trap for each disabled information handling resource, such that when an enable register for a disabled information handling resource is accessed by an operating system executing on the information handling system, an interrupt is generated allowing a basic input/output system of the information handling system to override the attempted access to the enable register.

* * * * *